United States Patent
Hwang et al.

(10) Patent No.: US 10,349,307 B2
(45) Date of Patent: Jul. 9, 2019

(54) METHOD AND TERMINAL FOR REMOVING INTERFERENCE

(71) Applicant: LG ELECTRONICS INC., Seoul (KR)

(72) Inventors: Jinyup Hwang, Seoul (KR); Yoonoh Yang, Seoul (KR); Sangwook Lee, Seoul (KR); Suhwan Lim, Seoul (KR); Manyoung Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 119 days.

(21) Appl. No.: 15/503,366

(22) PCT Filed: Aug. 13, 2015

(86) PCT No.: PCT/KR2015/008502
§ 371 (c)(1),
(2) Date: Feb. 10, 2017

(87) PCT Pub. No.: WO2016/024834
PCT Pub. Date: Feb. 18, 2016

(65) Prior Publication Data
US 2017/0238207 A1  Aug. 17, 2017

Related U.S. Application Data

(63) Continuation of application No. 62/037,093, filed on Aug. 13, 2014.

(51) Int. Cl.
*H04L 12/28* (2006.01)
*H04W 28/04* (2009.01)
(Continued)

(52) U.S. Cl.
CPC ............ *H04W 28/04* (2013.01); *H04B 17/24* (2015.01); *H04J 11/00* (2013.01); *H04J 11/0056* (2013.01);
(Continued)

(58) Field of Classification Search
None
See application file for complete search history.

(56) References Cited

U.S. PATENT DOCUMENTS

2014/0087720 A1* 3/2014 Takano ................ H04B 7/024
455/422.1
2014/0128115 A1* 5/2014 Siomina ............... H04L 1/0015
455/501
(Continued)

FOREIGN PATENT DOCUMENTS

KR    20100059353    6/2010
KR    20140085365    7/2014
(Continued)

OTHER PUBLICATIONS

LTE, 3GPP TS 36.211 V10.4.0, "3rd Generation Partnership Project; Technical Specification Group Radio Access Network; Evolved Universal Terrestrial Radio Access (E-UTRA); Physical Channels and Modulation (Release 10)," Dec. 2011, 101 pgs.
(Continued)

*Primary Examiner* — Noel R Beharry
*Assistant Examiner* — Lionel Preval
(74) *Attorney, Agent, or Firm* — Lee, Hong, Degerman, Kang & Waimey

(57) ABSTRACT

An aspect of the present disclosure provides a method of removing interference at a terminal. The method may include the steps of: receiving information on a plurality of measurement sets for an interfering cell from a serving cell; performing a first measurement on a subframe indicated by (Continued)

a first measurement set from a plurality of measurement sets based on a cell-specific reference signal (CRS) received from a remote radio head (RRH) and a macro base station in the interfering cell; and performing a second measurement on a subframe indicated by a second set of measurements based on a CRS received from the macro base station in the interfering cell; and reporting a result of the first measurement and a result of the second measurement to the serving cell.

10 Claims, 15 Drawing Sheets

(51) Int. Cl.
| | |
|---|---|
| H04J 11/00 | (2006.01) |
| H04B 17/24 | (2015.01) |
| H04L 1/16 | (2006.01) |
| H04L 5/00 | (2006.01) |
| H04W 24/08 | (2009.01) |
| H04W 24/10 | (2009.01) |

(52) U.S. Cl.
CPC ............ *H04L 1/1614* (2013.01); *H04L 5/005* (2013.01); *H04L 5/0035* (2013.01); *H04L 5/0073* (2013.01); *H04W 24/08* (2013.01); *H04W 24/10* (2013.01)

(56) References Cited

U.S. PATENT DOCUMENTS

2015/0092582 A1* 4/2015 Liao ..................... H04J 11/005
   370/252
2017/0012691 A1* 1/2017 Lee ..................... H04L 25/0226

FOREIGN PATENT DOCUMENTS

| WO | 2013055126 | 4/2013 |
| WO | 2014014743 | 1/2014 |
| WO | 2014112716 | 7/2014 |

OTHER PUBLICATIONS

PCT International Application No. PCT/KR2015/008502, International Search Report dated Nov. 27, 2015, 4 pages.

* cited by examiner

METHOD AND TERMINAL FOR REMOVING INTERFERENCE

CROSS-REFERENCE TO RELATED APPLICATIONS

This application is the National Stage filing under 35 U.S.C. 371 of International Application No. PCT/KR2015/008502, filed on Aug. 13, 2015, which claims the benefit of U.S. Provisional Application No. 62/037,093, filed on Aug. 13, 2014, the contents of which are all hereby incorporated by reference herein in their entirety.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink.

Such LTE may be divided into a frequency division duplex (FDD) type and a time division duplex (TDD) type.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, recently, a technique called a Cooperative Multi-point transmission/reception (CoMP) is introduced. According to the CoMP technique, a user equipment (UE) may receive data from a plurality of transmission points (TPs) simultaneously. Here, the transmission point may be a base station or a Remote Radio Head (RRH).

Generally, since an RRH uses the same cell ID with a base station, a cell-specific reference signal (CRS) generated based on a cell ID also becomes the same between an RRH and a base station, and thus, the RRH does not transmit the CRS.

However, the fact that the RRH does not transmit the CRS does not matter at all on the basis of a serving cell of a UE, but matters on the basis of a neighbor cell that exerts interference on the UE. The reason is that a UE is unable to accurately measure the RSRP for an RRH of the neighbor cell, since the RRH operates in the CoMP in the neighbor cell does not transmit the CRS.

SUMMARY OF THE INVENTION

Accordingly, a disclosure of the present specification has been made in an effort to solve the aforementioned problem.

In an aspect, a disclosure of the present specification provides a method for removing interference in a UE. The method may include receiving information on a plurality of measurement sets for an interference cell from a serving cell; performing a first measurement based on a Cell-specific Reference Signal (CRS) received from a macro eNodeB and a Remote radio head (RRH) corresponding to the interference cell on a subframe indicated by a first measurement set among the plurality of measurement sets; performing a second measurement based on a CRS received from the macro eNodeB corresponding to the interference cell on a subframe indicated by a second measurement set among the plurality of measurement sets; reporting a result of the first measurement and a result of the second measurement to the serving cell; acquiring information of a target that causes greater interference to the user equipment among the macro eNodeB and the RRH corresponding to the interference cell from the serving cell; and removing interference from the target that causes greater interference based on the acquired information.

The first measurement set and the second measurement set may indicate different subframes.

The macro eNodeB and the RRH in the interference cell may be configured by a cooperative communication according to a Cooperative Multi-point (CoMP).

The information on each measurement set may be represented by a bitmap format.

The information on the plurality of measurement sets may be received through a higher layer signaling.

In another aspect, a disclosure of the present specification also provides a UE available for removing interference. The UE may include a radio frequency (RF) unit configured to receive information on a plurality of measurement sets for an interference cell from a serving cell; and a processor configured to: perform a first measurement based on a Cell-specific Reference Signal (CRS) received from a macro eNodeB and a Remote radio head (RRH) corresponding to the interference cell on a subframe indicated by a first measurement set among the plurality of measurement sets and perform a second measurement based on a CRS received from the macro eNodeB corresponding to the interference cell on a subframe indicated by the second measurement set among the plurality of measurement sets. In addition, the processor may control the RF unit to: report a result of the first measurement and a result of the second measurement to the serving cell and acquiring information of a target that causes greater interference to the user equipment among the macro eNodeB and the RRH corresponding to the interference cell from the serving cell. In addition, the processor may control the RF unit to remove interference from the target that causes greater interference based on the acquired information.

Advantageous Effects

According to a disclosure of the present specification, by removing a data interference signal from a neighbor cell, a signal SINR from a serving cell is increased, thereby obtaining a performance benefit.

DESCRIPTION OF EXEMPLARY EMBODIMENTS

Figure 1:
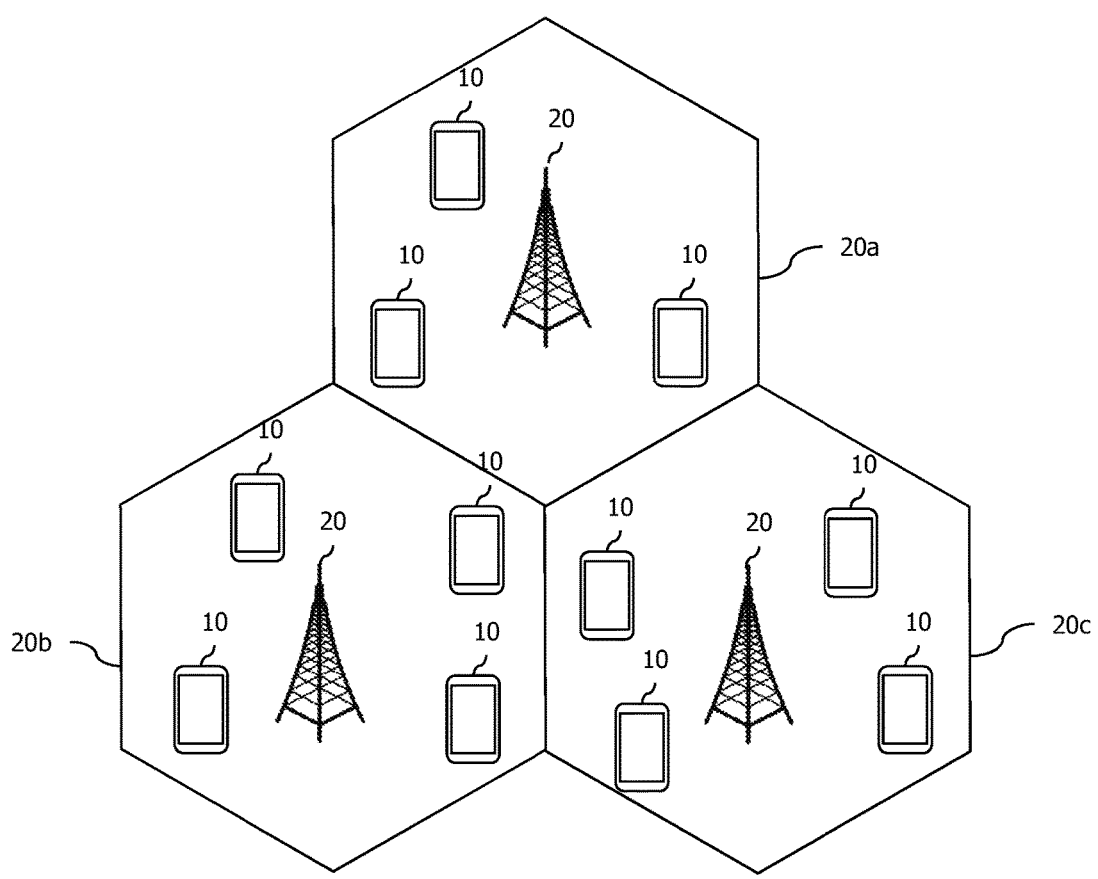
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

Referring to FIG. 1, the wireless communication system includes at least one base station (BS) 20. Respective BS s 20 provide a communication service to particular geographical areas 20a, 20b, and 20c (which are generally called cells).

The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Hereinafter, the LTE system will be described in detail.

Figure 2:
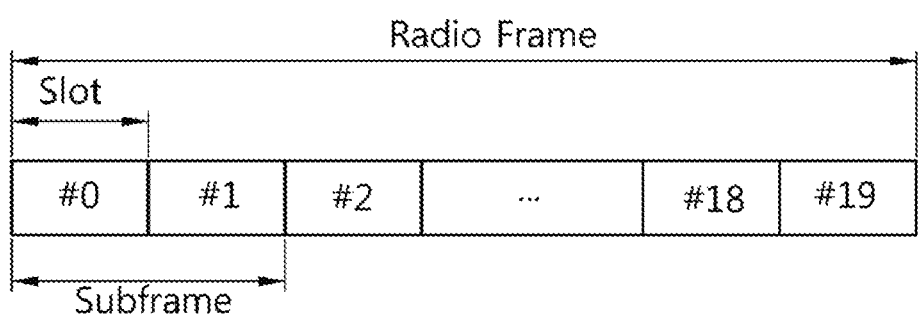
FIG. 2 illustrates the architecture of a radio frame according to frequency division duplex (FDD) of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
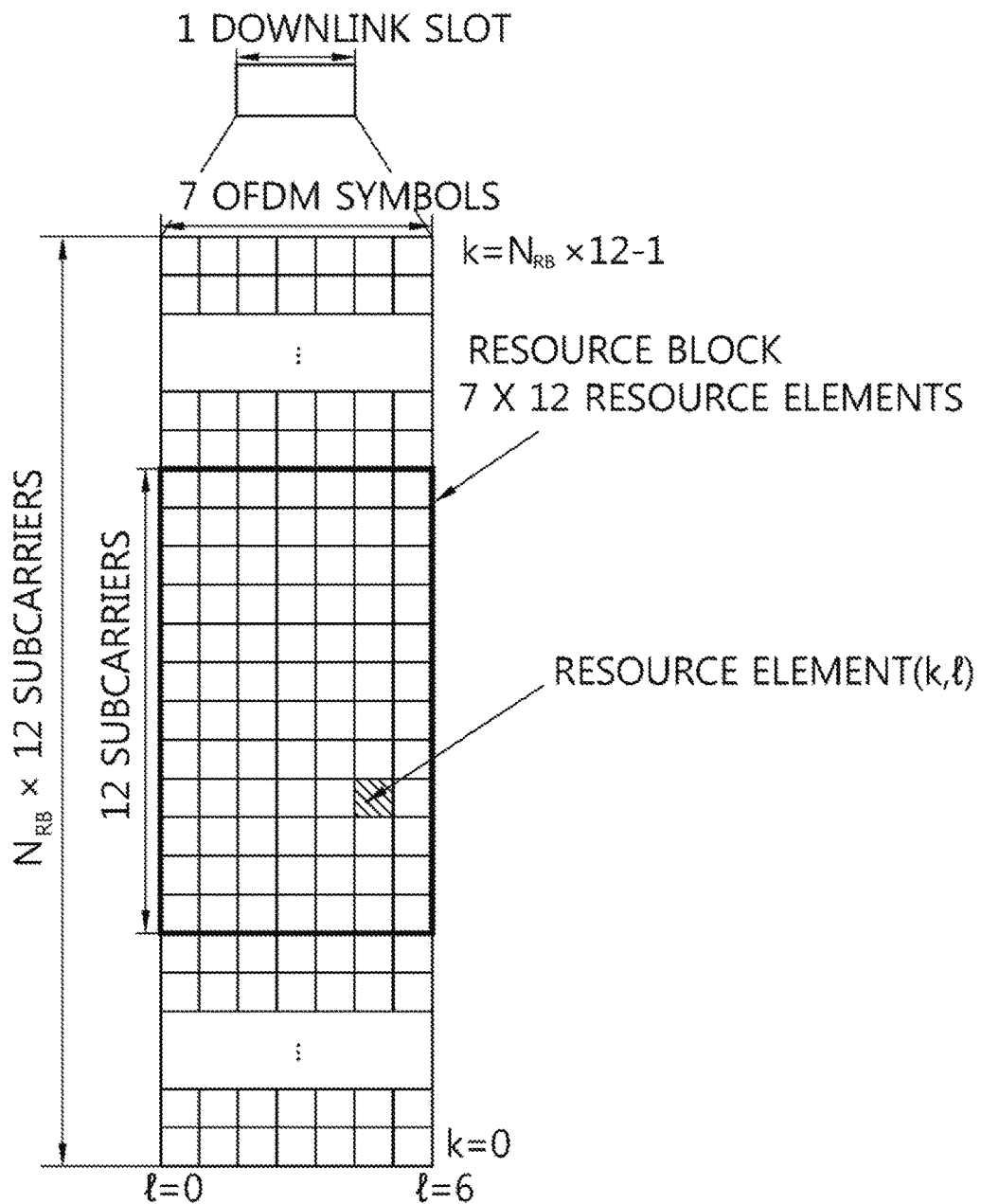
FIG. 3 illustrates an example resource grid for one uplink or downlink slot in 3GPP LTE.

FIG. 3 illustrates an example resource grid for one uplink or downlink slot in 3GPP LTE.

Referring to FIG. 3, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

Figure 4:
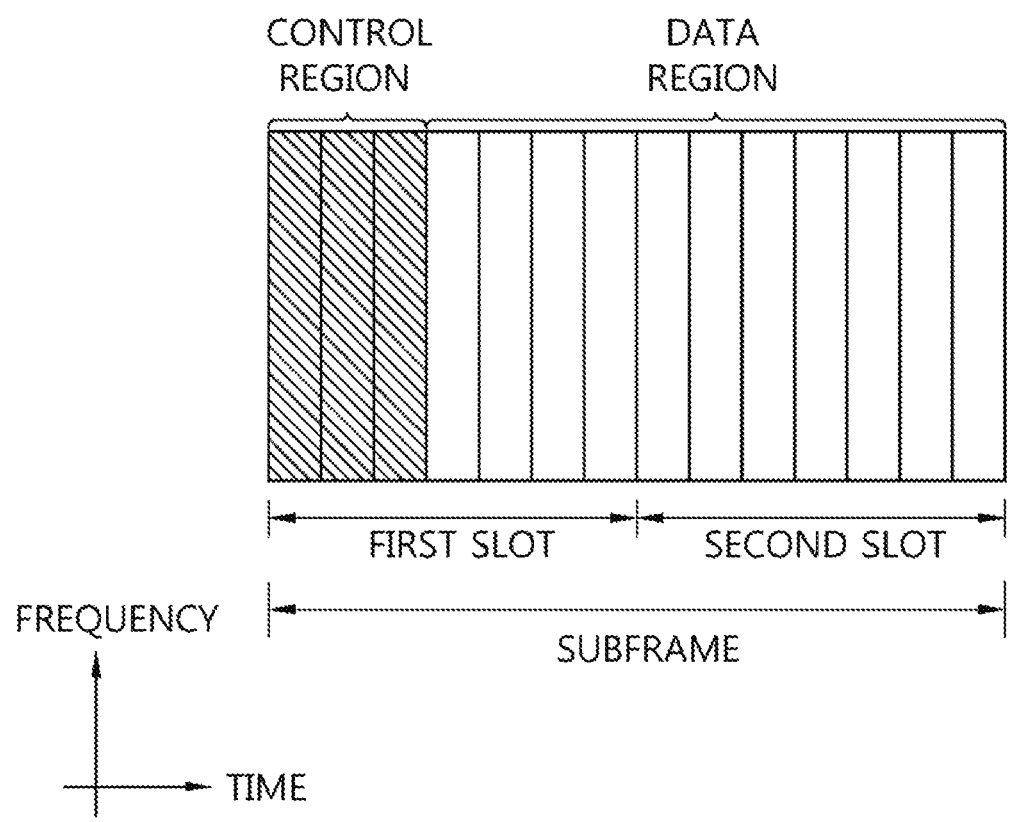
FIG. 4 illustrates the architecture of a downlink subframe.

In 3GPP LTE, the resource grid for one uplink slot shown in FIG. 4 may also apply to the resource grid for the downlink slot.

FIG. 4 illustrates the architecture of a downlink sub-frame.

In FIG. 4, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are allocated to the control region, and a PDSCH is allocated to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

When a terminal monitors the PDCCH based on the C-RNTI, the DCI format and the search space which is to be monitored are determined according to the transmission mode of the PDSCH. The table below represents

TABLE 1

| Transmission mode | DCI format | Search space | Transmission mode of PDSCH according to PDCCH |
|---|---|---|---|
| Transmission mode 1 | DCI format 1A | Public service and terminal specific | Single antenna port, port 0 |
|  | DCI format 1 | Terminal specific | Single antenna port, port 0 |
| Transmission mode 2 | DCI format 1A | Public service and terminal specific | Transmit diversity |
|  | DCI format 1 | Terminal specific | Transmit diversity |

TABLE 1-continued

| Transmission mode | DCI format | Search space | Transmission mode of PDSCH according to PDCCH |
|---|---|---|---|
| Transmission mode 3 | DCI format 1A | Public service and terminal specific | Transmit diversity |
| | DCI format 2A | Terminal specific | CDD(Cyclic Delay Diversity) or transmit diversity |
| Transmission mode 4 | DCI format 1A | Public service and terminal specific | Transmit diversity |
| | DCI format 2 | Terminal specific | Closed-loop spatial multiplexing |
| Transmission mode 5 | DCI format 1A | Public service and terminal specific | Transmit diversity |
| | DCI format 1D | Terminal specific | MU-MIMO(Multi-user Multiple Input Multiple Output) |
| Transmission mode 6 | DCI format 1A | Public service and terminal specific | Transmit diversity |
| | DCI format 1B | Terminal specific | Closed-loop spatial multiplexing |
| Transmission mode 7 | DCI format 1A | Public service and terminal specific | If the number of PBCH transmisison ports is 1, single antenna port, port 0. Otherwise, transmit diversity |
| | DCI format 1 | Terminal specific | Single antenna port, port 5 |
| Transmission mode 8 | DCI format 1A | Public service and terminal specific | If the number of PBCH transmisison ports is 1, single antenna port, port 0. Otherwise, transmit diversity |
| | DCI format 2B | Terminal specific | Dual layer transmisison (port 7 or 8), or single antenna port, port 7 or 8 |
| Transmission mode 9 | DCI format 1A | Public service and terminal specific | Non-MBSFN subframe: if the number of PBCH antenna ports is 1, port 0 is used as independent antenna port. Otherwise, transmit Diversity MBSFN subframe: port 7 as independent antenna port |
| | DCI format 2C | Terminal specific | 8 transmisison layers, ports 7-14 are used or port 7 or 8 is used as independent antenna port |
| Transmission mode 10 | DCI 1A | Public service and terminal specific | Non-MBSFN subframe: if the number of PBCH antenna ports is 1, port 0 is used as independent antenna port. Otherwise, transmit Diversity MBSFN subframe: port 7 as independent antenna port |
| | DCI format 2D | Terminal specific | 8 transmisison layers, ports 7-14 are used or port 7 or 8 is used as independent antenna port |

The usage of the DCI format is classified as shown in Table 3 below.

TABLE 2

| DCI format | Contents |
|---|---|
| DCI format 0 | Used in PUSCH scheduling |
| DCI format 1 | Used in scheduling of one PDSCH codeword |
| DCI format 1A | Used in compact scheduling of one PDSCH codeword and random access process |
| DCI format 1B | Used in compact scheduling of one PDSCH codeword having precoding information |
| DCI format 1C | Used in very compact scheduling of one PDSCH codeword |
| DCI format 1D | Used in precoding and compact scheduling of one PDSCH codeword having power offset information |
| DCI format 2 | Used in PDSCH scheduling of terminals configured in closed-loop spatial multiplexing mode |
| DCI format 2A | Used in PDSCH scheduling of terminals configured in open-loop spatial multiplexing mode |
| DCI format 2B | DCI format 2B is used for resouce allocation for dual-layer beam-forming of PDSCH. |
| DCI format 2C | DCI format 2C is used for resouce allocation for closed-loop SU-MIMO or MU-MIMO operation to 8 layers. |
| DCI format 2D | DCI format 2C is used for resouce allocation to 8 layers. |
| DCI format 3 | Used to transmit TPC command of PUCCH and PUSCH having 2 bit power adjustments |
| DCI format 3A | Used to transmit TPC command of PUCCH and PUSCH having 1 bit power adjustment |
| DCI format 4 | Used in PUSCH scheduling of uplink (UP) operated in multi-antenna port transmisison mode |

The uplink channels include a PUSCH, a PUCCH, an SRS (Sounding Reference Signal), and a PRACH (physical random access channel).

Figure 5:
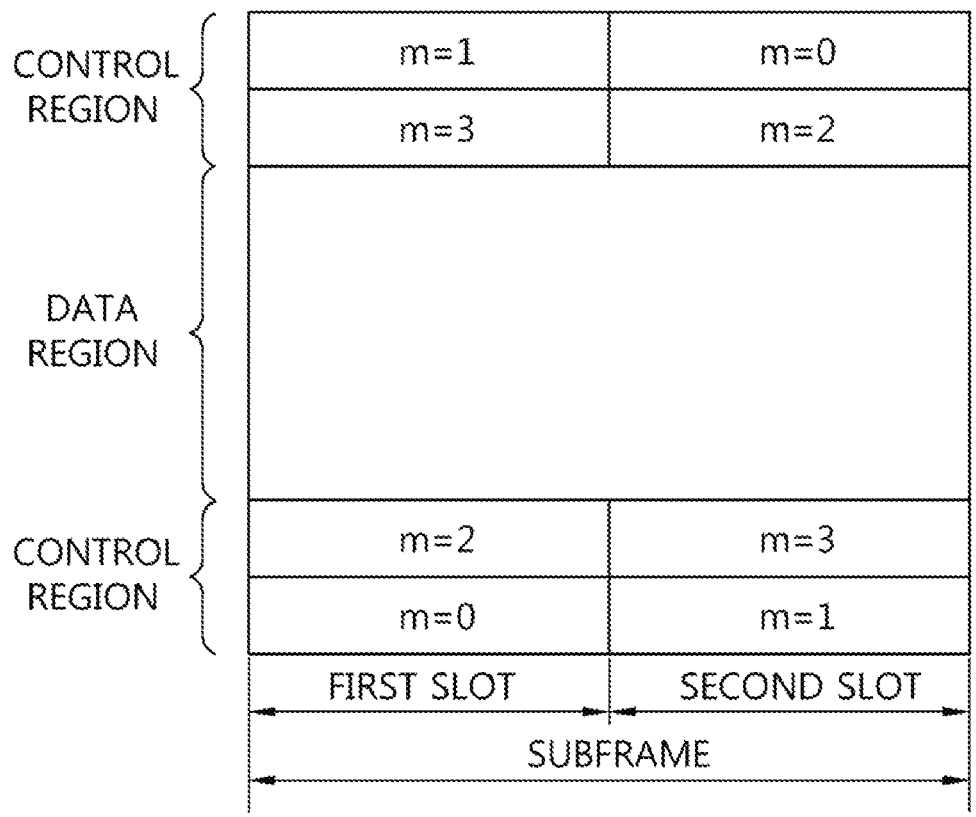
FIG. 5 illustrates the architecture of an uplink subframe in 3GPP LTE.

FIG. 5 illustrates the architecture of an uplink sub-frame in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

<Reference Signal>

Meanwhile, a reference signal (RS) is described below.

In general, transmission information, for example, data is easily distorted and changed while it is transmitted through a radio channel. Accordingly, a reference signal is required in order to demodulate such transmission information without an error. The reference signal is a signal known to both a transmitter and a receiver and is transmitted along with transmission information. Since transmission information transmitted by a transmitter experiences a corresponding channel for each transmission antenna or layer, a reference signal may be allocated to each transmission antenna or layer. A reference signal for each transmission antenna or layer may be identified using resources, such as a frequency and code. A reference signal may be used for two purposes, that is, the demodulation and channel estimation of transmission information.

A downlink reference signal may be divided into a cell-specific reference signal (CRS), an MB SFN (multimedia broadcast and multicast single frequency network) reference signal, a UE-specific reference signal (UE-specific RS, URS), a positioning reference signal (positioning RS, PRS), and a CSI reference signal (CSI-RS). The CRS is a reference signal transmitted to all UEs within a cell and also called a common reference signal. The CRS may be used for the channel measurement of CQI feedback and the channel estimation of PDSCH. The MBSFN reference signal may be transmitted in a subframe allocated for MBSFN transmission. The URS is a reference signal received by a specific UE or specific UE group within a cell and may be called a demodulation reference signal (DM-RS). The DM-RS is chiefly used for a specific UE or specific UE group to perform data demodulation. The PRS may be used to estimate the location of UE. The CSI-RS is used for the channel estimation of the PDSCH of LTE-A UE. The CSI-RSs are deployed relatively sparsely in a frequency domain or time domain and may be punctured in the data region of a common subframe or MBSFN subframe.

Figure 6:
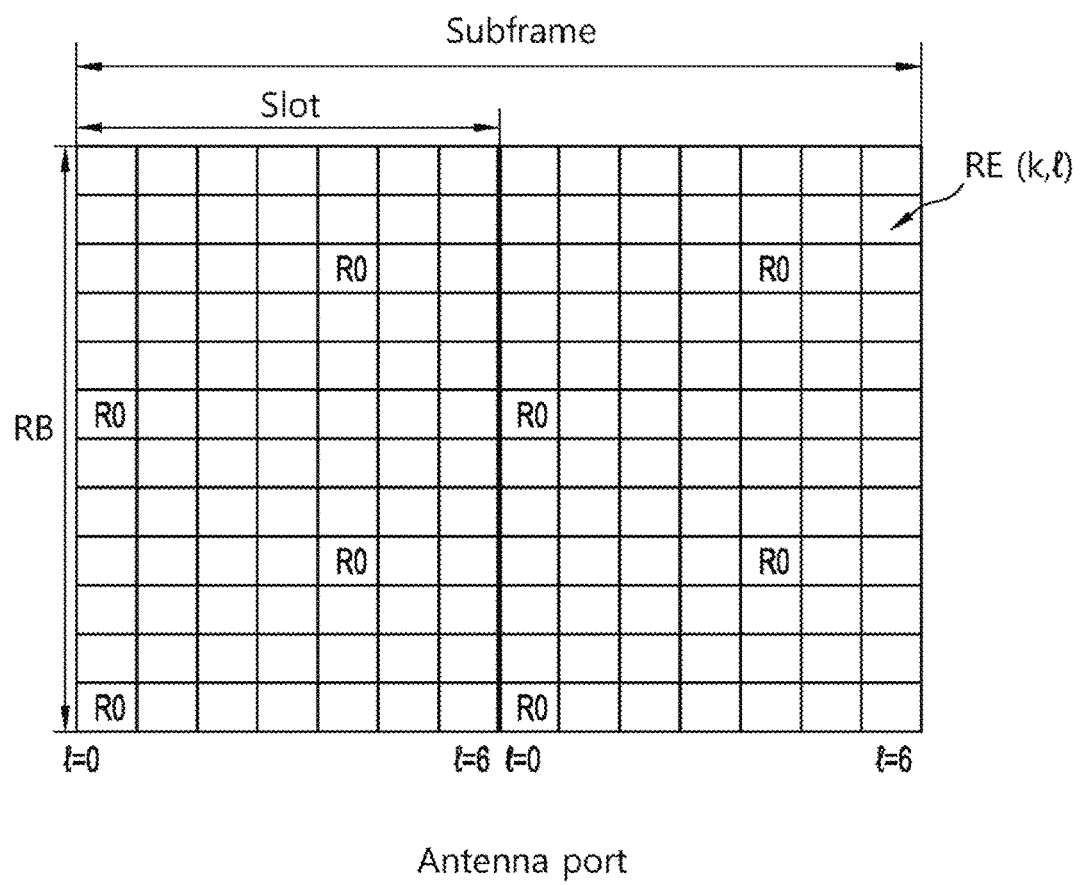
FIG. 6 illustrates an example of a pattern in which CRSs are mapped to RBs in the case that an eNodeB uses a single antenna port.

FIG. 6 illustrates an example of a pattern in which CRSs are mapped to RBs in the case that an eNodeB uses a single antenna port.

Referring to FIG. 6, RO illustrates an RE to which a CRS transmitted by the antenna port number 0 of an eNodeB is mapped.

The CRS is transmitted in all downlink subframes within a cell that supports PDSCH transmission. The CRS may be transmitted on antenna ports 0 to 3. The CRS may be defined only with respect to $\Delta f=15$ kHz. A pseudo-random sequence $r_{1,n_s}(m)$ generated from a seed value based on a cell ID (identity) is subject to resource mapping as a complex-valued modulation symbol $a^{(p)}_{k,l}$. In this case, $n_s$ is a slot number within a single radio frame, p is an antenna port, and t is an OFDM symbol number within the slot. K is a subcarrier index. l and k are represented as in the following equation.

$$k = 6m + (v + v_{shift}) \bmod 6 \quad \text{[Equation 1]}$$

$$l = \begin{cases} 0, N^{DL}_{symb} - 3 & \text{if } p \in \{0, 1\} \\ 1 & \text{if } p \in \{2, 3\} \end{cases}$$

$$v_{shift} = N^{cell}_{ID} \bmod 6$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

In Equation 1, p denotes an antenna port, and $n_s$ denotes a slot number 0 or 1.

k has 6 shifted indices according to a cell ID ($N^{Cell}_{ID}$). Accordingly, cells having cell IDs 0, 6, 12, . . . , that is, a multiple of 6, send CRSs in the same subcarrier location k.

In Equation 1, t is determined by the antenna port p, and may have a possible value of 0, 4, 7, or 11. Accordingly, the CRS is transmitted on $0^{th}$, $4^{th}$, $7^{th}$ or $11^{th}$ symbol.

A resource element (RE) allocated to the CRS of a single antenna port may not be used to send another antenna port and needs to be configured to be zero. Furthermore, in an MBSFN (multicast-broadcast single frequency network) subframe, the CRS is transmitted only in a non-MBSFN region.

Figure 7:
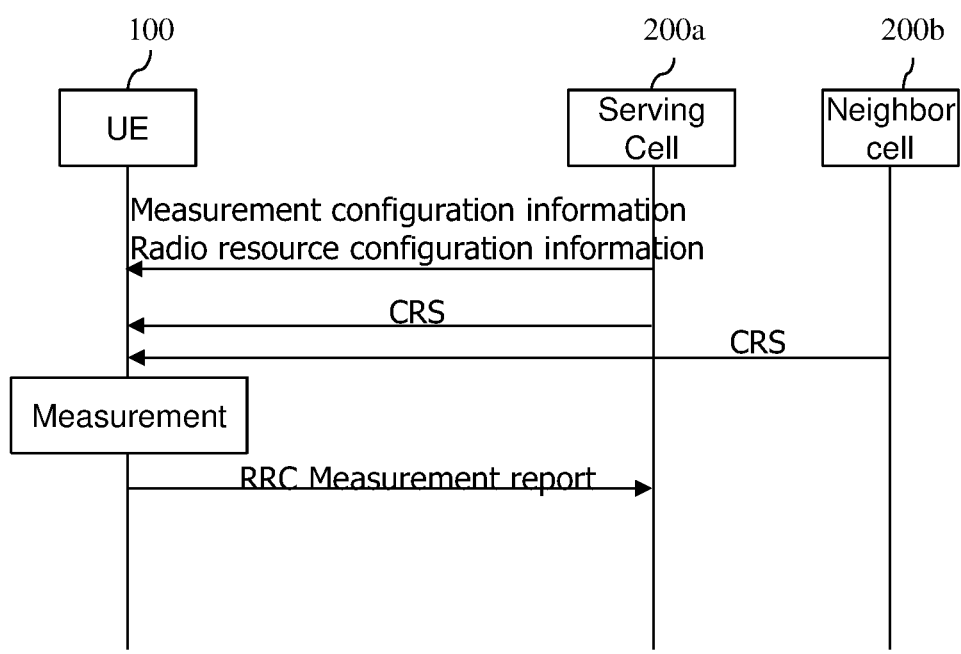
FIG. 7 illustrates a measurement and a measurement report procedures.

FIG. 7 illustrates a measurement and a measurement report procedures.

In a mobile communication system, a mobility support for UE 100 is essential. Accordingly, the UE 100 continues to measure quality of a serving cell that now provides service to the UE 100 and quality of neighboring cells. The UE 100 reports a measurement result to a network at a proper time, and the network provides optimal mobility to the UE through handover. The measurement for such a purpose is called radio resource management (RRM).

The UE 100 may monitor downlink quality of a primary cell (Pcell) based on a CRS. This is called RLM (Radio Link Monitoring). For such RLM, the UE 100 estimates a downlink quality and compares the estimated downlink quality with thresholds, for example, Qout and Qin. The threshold Qout is defined as a level in which downlink reception cannot be stably performed, and corresponds to 10% error of PDCCH transmission by taking into consideration a PCFICH error. The threshold Qin is defined as a level in which downlink may be very significantly reliable compared to the threshold Qout, and corresponds to 2% error of PDCCH transmission by taking into consideration a PCFICH error.

As may be seen with reference to FIG. 7, when a serving cell 200a and a neighboring cell 200b send respective CRSs (Cell-specific Reference Signals) to the UE 100, the UE 100 performs measurement through the CRSs and transmits an RRC measurement report message, including a measurement result, to the serving cell 200a.

In this case, the UE 100 may perform a measurement using the following three methods.

1) RSRP (reference signal received power): This indicates the mean reception power of all REs that carry a CRS transmitted in the entire band. In this case, the mean reception power of all REs that carry a CSI RS instead of the CRS may be measured.

2) An RSSI (received signal strength indicator): this indicates reception power measured in the entire band. The RSSI includes all of a signal, interference, and thermal noise.

3) RSRQ (reference symbol received quality): this indicates a CQI, and may be determined to be an RSRP/RSSI according to a measurement bandwidth or subband. That is, the RSRQ means an SINR (signal-to-noise interference ratio). The RSRP does not provide sufficient mobility information, and thus RSRQ may be used in a handover or cell reselection process instead of RSRP.

RSRQ may be calculated by RSSI/RSSP.

Meanwhile, for the measurement, the UE 100 receives a measurement configuration information element (IE) from the serving cell 100a. A message including the measurement configuration IE is called a measurement configuration message. In this case, the measurement configuration IE may be received through an RRC connection reconfiguration message. When a measurement result satisfies a report condition within the measurement configuration information, the UE reports the measurement result to an eNodeB. A message including the measurement result is called a measurement report message.

The measurement configuration IE may include measurement object information. The measurement object information is information about an object on which UE may perform measurement. The measurement object includes at least one of an intra-frequency measurement target that is the subject of intra-cell measurement, an inter-frequency measurement target that is the subject of inter-cell measurement, and an inter-RAT measurement target that is the subject of inter-RAT measurement. For example, the intra-frequency measurement target may indicate a neighbor cell having the same frequency band as a serving cell. The inter-frequency measurement target may indicate a neighboring cell having a frequency band different from that of a serving cell. The inter-RAT measurement target may indicate a neighboring cell having an RAT different from the RAT of a serving cell.

<Carrier Aggregation (CA)>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provide an additional radio resource.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carriers are contiguous and the case where the control channels are non-contiguous. The number of component carriers aggregated between DL and UL may be differently configured. When the number of DL CCs and the number of UL CCs are the same, this is called symmetric aggregation. On the other hand, when the number of DL CCs and the number of UL CCs are different, this is called asymmetric aggregation.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Otherwise, rather than using the bandwidths of the existing system, new bandwidths may be defined to configure a wide band.

In order for packet data to be transmitted and received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. A UE may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is available. A UE may receive system information (SI) necessary for receiving packets from the deactivated cell. On the contrary, the UE does not monitor or receive a control channel (PDCCH) and data channel (PDSCH) of the deactivated cell in order to identify resources (probably frequency or time) assigned thereto.

<Inter-cell Interference>

Figure 8:
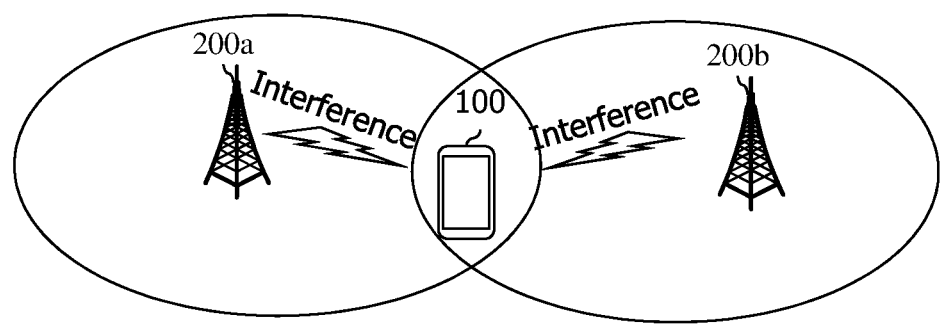
FIG. 8 illustrates an interference problem among cells.

FIG. 8 illustrates an interference problem among cells.

As may be seen with reference to FIG. 8, in the case that a UE 100 is located in an overlapped coverage between the coverage of a first cell 200a and the coverage of a second cell 200b, the signal of the first cell 200a exerts interference on the signal of the second cell 200b, on the contrary, the signal of the second cell 200b exerts interference on the signal of the first cell 200a.

A basic method for addressing the interference problem is using different frequencies in the heterogeneous network. However, since a frequency is a scarce and expensive resource, wireless service providers do not prefer a frequency division method.

Thus, the 3GPP employs a time division method to resolve the inter-cell interference problem.

Accordingly, the 3GPP are actively conducting studies on enhanced inter-cell interference coordination (eICIC) as an interference coordination method.

A time division method introduced to LTE-Release 10 has evolved as compared with a conventional frequency division method and thus is referred to as an enhanced ICIC. According to the time division method, an aggressor cell or primary cell, which is a cell causing interference, suspends data transmission in a particular subframe so that the UE maintains connection to a victim cell or secondary cell, which is a cell undergoing the interference, in the subframe. That is, in the time division method, when heterogeneous cells coexist, one cell temporarily suspends transmitting a signal to a terminal having considerably high interference, thereby hardly sending an interference signal.

Meanwhile, the particular subframe in which data transmission is suspended is referred to as an almost blank subframe (ABS), in which no data is transmitted except for essential control data. The essential control data is, for example, a cell-specific reference signal (CRS). In current 3GPP LTE/LTE-A, CRSs are present in the $0^{th}$, $4^{th}$, $7^{th}$, and $11^{th}$ OFDM symbols in each subframe on the time axis. Thus, only CRSs are transmitted on the $0^{th}$, $4^{th}$, FDMA $7^{th}$, and $11^{th}$ OFDM symbols in an ABS.

Figure 9:
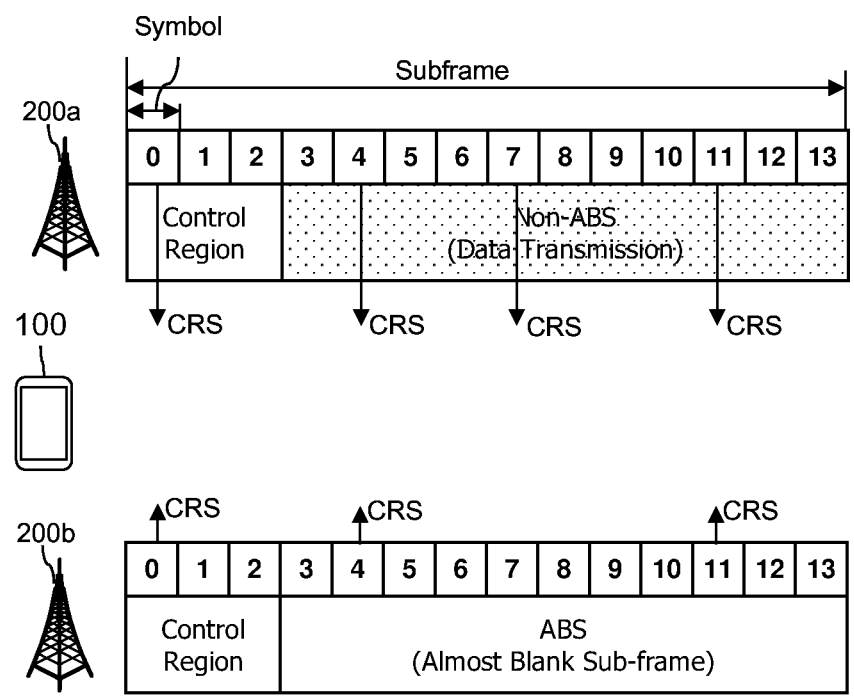
FIG. 9 illustrates an eICIC (enhanced Inter-Cell Interference Coordination) for solving interference problem between eNodeBs.

FIG. 9 illustrates an eICIC (enhanced Inter-Cell Interference Coordination) for solving interference problem between eNodeBs.

Referring to FIG. 9, a first cell 200a performs a data transmission in the data region of the illustrated subframe.

In this case, in order to solve the interference problem, a second cell 200b applies an eICIC. That is, when the eICIC is applied, a corresponding subframe is operated according to an ABS, and any data may not be transmitted in the data region.

However, in the subframe operated depending on the ABS, only a CRS may be transmitted on $0^{th}$, $4^{th}$, $7^{th}$, and $11^{th}$ OFDM symbols.

As described above, in addition to the solution of the inter-cell interference problem through the eICIC technique, there may be a method for a UE 100 to perform a reception through Interference Cancellation (hereinafter, referred to as IC).

Figure 10:
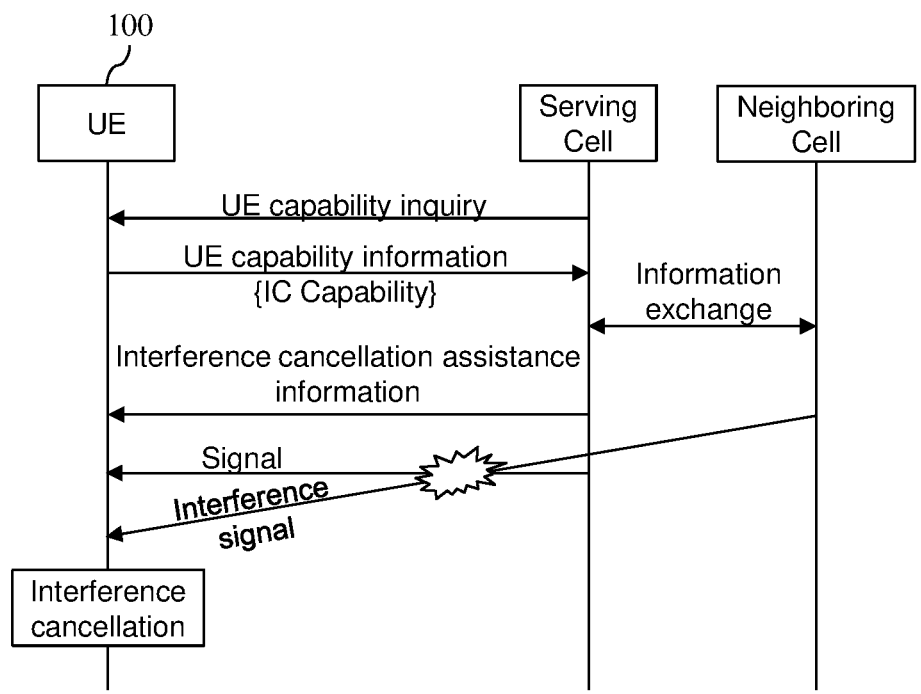
FIG. 10 is an exemplary signal flowchart illustrating a reception method using an interference cancellation.

FIG. 10 is an exemplary signal flowchart illustrating a reception method using an interference cancellation.

A serving cell request a UE capability inquiry to the UE 100 as occasion demands or following an instruction from a higher layer.

Then, the UE 100 provides the UE capability information according to the request. That is, in response to the UE capability inquiry, the UE 100 notifies that it has the eICIC capability and the CRS interference cancellation (IC) capability to the small-scale cell 300 that corresponds to the serving cell through the UE capability information. Meanwhile, in the case that the radio access performance of the UE 100 is changed, the higher layer of the UE 100 may instruct to request the capability inquiry to the higher layer of the small-scale cell 300.

Meanwhile, through information exchange with a neighboring cell, the serving cell may check whether the neighboring cell is an aggressor cell that causes interference. In the case that the neighboring cell is an aggressor cell that causes interference, the serving cell acquires the information of an arbitrary channel of the neighboring cell.

Next, when the serving cell has a signal to transmit to the UE 100, the serving cell transmits the interference cancellation assistance information including the information of the acquired arbitrary channel to the UE 100.

Subsequently, the serving cell transmits the signal to the UE 100.

In this case, when the signal transmitted by the serving cell is interfered by the signal transmitted by the neighboring cell, the UE 100 performs the interference cancellation.

The performance of receiving a signal through the IC as above is referred to as a Further Enhanced Inter-Cell Interference Coordination (FeICIC).

As such, an interference signal is removed from a neighboring cell, and the SINR of a signal from a serving cell is more improved, thereby obtaining performance benefit.

Meanwhile, a signal or channel which is a target of the interference cancellation may be a Cell-specific Reference Signal (CRS), a Physical Broadcasting Channel (PBCH), a Sync Channel (SCH), a Physical downlink shared channel (PDSCH), and so on.

In the case that the target of the interference cancellation is the CRS, the PBCH, and the like, the serving cell may forward the interference cancellation assistance information with the information of the CRS, the PBCH, and the like being included.

However, in the case that the target of the interference cancellation is the PDSCH, the amount of information required to remove the PDSCH is too huge and changed in real time, and thus, the serving cell may not forward the information. In this case, the UE should obtain the information required to remove interference by performing a Blind Detection (BD) for the PDSCH.

<Cooperative Multi-point Transmission/Reception (CoMP)>

On the other hand, a cooperative multi-point transmission/reception CoMP is described below.

CoMP means an inter-node cooperative communication scheme. In multi-cell multi-distributive node systems, inter-cell interference may be reduced using CoMP. In single cell multi-distributive node systems, inter-cell inter-point interference may be reduced. Use of CoMP enables the UE to be jointly supported by multiple nodes. When CoMP is used, each eNodeB may simultaneously support one or more UEs using the same radio frequency resource to improve system performance. Further, when CoMP is used, the eNodeB may perform a space division multiple access (SDMA) method based on information on the channel state between the eNodeB and the UE.

A major purpose of the CoMP is to enhance communication performance of UEs at a cell boundary or node boundary.

Figure 11:
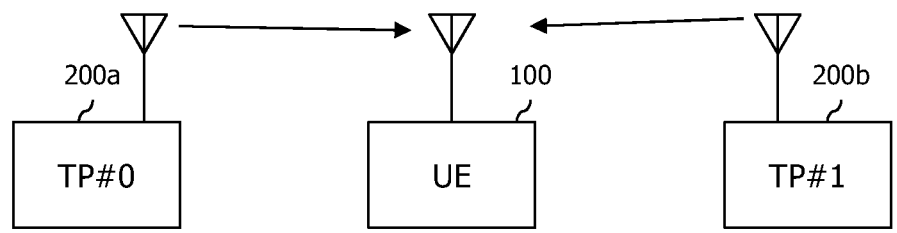
FIG. 11 illustrates an example of CoMP.

FIG. 11 illustrates an example of CoMP.

Referring to FIG. 11, two transmission points (TPs) 200a and 200b and a UE 100 are shown. Each of the two TPs 200a and 200b may be an eNodeB or a Remote radio head (RRH). In other words, the two TPs may be a set of macro eNodeBs, a set of a macro eNodeB and a small-scale eNodeB, or a set of small-scale eNodeBs. Such a CoMP is defined as transmission mode 10 in Table 1.

Figure 12:
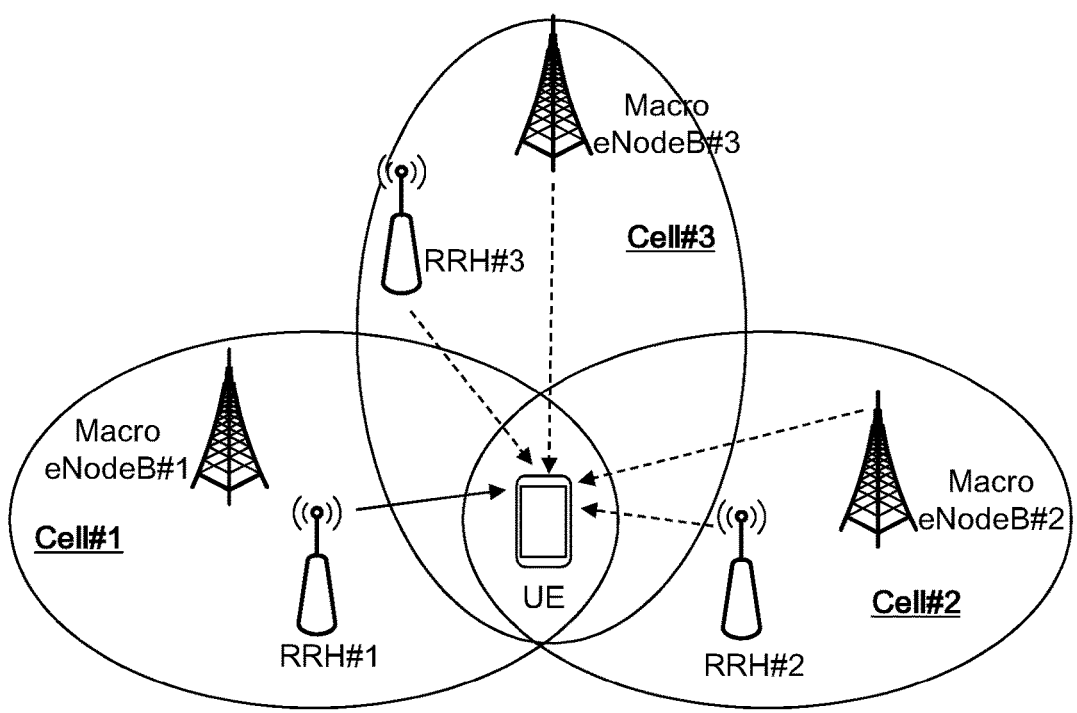
FIG. 12 illustrates a problem of RSRP measurement in the CoMP environment.

FIG. 12 illustrates a problem of RSRP measurement in the CoMP environment.

Referring to FIG. 12, a macro eNodeB#1 is existed in cell#1. In this case, in the cell #1, there is RRH#1 that cooperates with the macro eNodeB#1 for the CoMP operation.

Similarly, in cell #2, there is RRH#2 that cooperates with macro eNodeB#2 for the CoMP operation. And, in cell #3, there is RRH#3 that cooperates with macro eNodeB#3 for the CoMP operation.

The serving cell of a UE is the cell#1, and the cell#2 and the cell#3 are neighboring cells that cause interference.

Meanwhile, since the RRH belonged to each cell uses the same cell ID with the macro eNodeB, the RRH may not transmit a CRS. That is, since the macro eNodeB#1 and the RRH#1 use the same cell ID, only the macro eNodeB#1 may transmit a CRS and the RRH#1 may not transmit a CRS. Likewise, since the macro eNodeB#2 and the RRH#2 use the same cell ID, only the macro eNodeB#2 may transmit a CRS and the RRH#2 may not transmit a CRS. In addition, since the macro eNodeB#3 and the RRH#3 use the same cell ID, only the macro eNodeB#3 may transmit a CRS and the RRH#3 may not transmit a CRS.

In this case, in order for the UE, which is the serving cell that belongs to the cell#1, to remove an interference signal from the cell#2 and the cell#3 that are neighboring cells, the UE should measure the RSRP for the cell#2 and the cell#3 and report it to the serving cell.

However, in the situation shown in FIG. 12, since the RRH#2 and the RRH#3 do not transmit a CRS, in the measurement report that the UE transmits to the serving cell, only the RSRP for the macro eNodeB#2 and the macro eNodeB#3 is included, but the RSRP information for the RRH#2 and the RRH#3 that exert great interference actually is not included.

As such, since the RSRP information for the RRH#2 and the RRH#3 that causes great interference is not forwarded to the serving cell but only the RSRP information for the macro eNodeB#2 and the macro eNodeB#3 that causes smaller interference is forwarded to the serving cell, there is a problem that the serving cell determines that the UE may not remove interference, nor forward the interference cancellation assistance information to the UE.

<A Disclosure of the Present Specification>

In order to solve the problem described above, a disclosure of the present specification proposes a method for each cell that operates in a CoMP to configure a plurality of RSRP measurement sets (i.e., a plurality of RSRP measurement patterns). Here, the number of RSRP measurement sets (i.e., RSRP measurement patterns) may be extended to n depending on the number of RRHs that are operated in each cell.

Figure 13A:
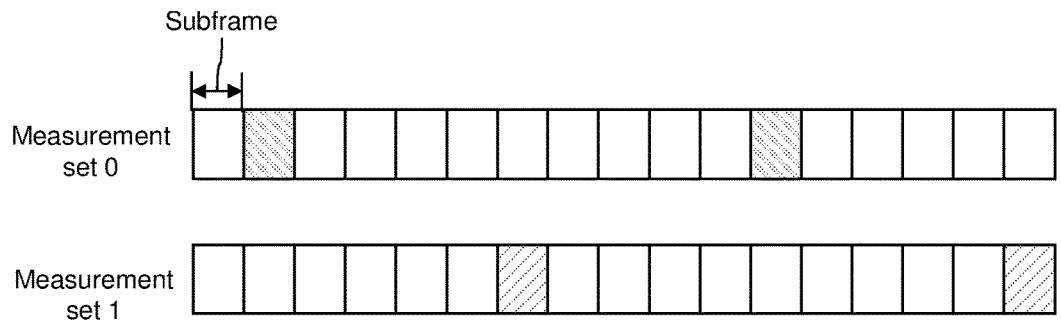
FIG. 13a illustrates an example in which a plurality of RSRP measurement sets is configured according to a disclosure of the present specification.

FIG. 13a illustrates an example in which a plurality of RSRP measurement sets is configured according to a disclosure of the present specification.

As may be seen with reference to FIG. 13a, a specific cell that operates in a CoMP may configure measurement set 0 (or RSRP measurement pattern 0) and measurement set 1 (or RSRP measurement pattern 1), for example. The measurement set 0 indicates a subframe that should be measured based on a CRS received from a macro eNodeB and an RRH. The measurement set 1 indicates a subframe that should be measured based on a CRS received only from the macro eNodeB. A point that should not be configured is that the macro eNodeB transmits a CRS in every subframe, basically. Therefore, for the subframe indicated in the measurement set, the subframe to which a CRS is transmitted is not indicated, but the subframe that should be measured is indicated. However, the RRH may transmit a CRS only on the subframe indicated by the measurement set.

Accordingly, on the subframe indicated in the measurement set 0, a UE may measure the RSRP based on the CRS from the macro eNodeB and the RRH. And, on the subframe indicated by the measurement set 1, a UE may measure the RSRP based on the CRS from the macro eNodeB.

Such a method of utilizing the RSRP measured by twice is described with reference to FIG. 13b.

Figure 13B:
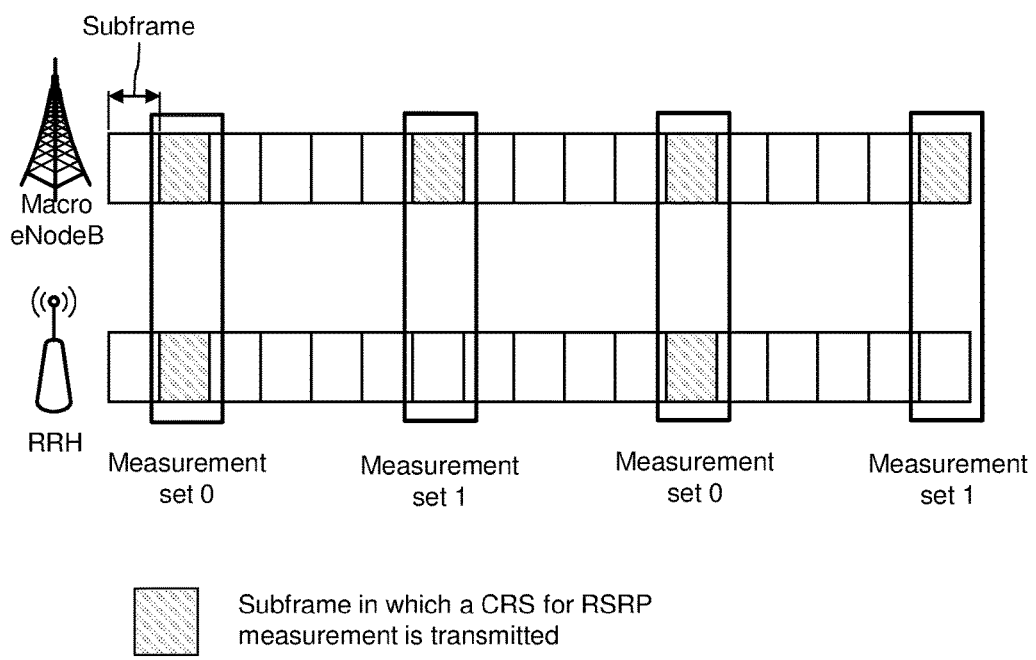
FIG. 13b illustrates a method for measuring a RSRP according to a plurality of RSRP measurement sets according to a disclosure of the present specification.

FIG. 13b illustrates a method for measuring a RSRP according to a plurality of RSRP measurement sets according to a disclosure of the present specification.

As may be seen with reference to FIG. 13b, a UE performs a measurement on the subframe indicated by each measurement set.

Particularly, the UE measures an RSRP based on the CRS from the macro eNodeB and the RRH on the subframe indicated by measurement set 0, and measures an RSRP based on only the CRS from the macro eNodeB on the subframe indicated by measurement set 1.

Later, the UE reports both of the RSRP measurement result (a first RSRP measurement result) on the subframe indicated by measurement set 0 and the RSRP measurement result (a second RSRP measurement result) on the subframe indicated by measurement set 1 to a serving cell.

Then, the serving cell becomes to know the difference between the first RSRP measurement result and the second RSRP measurement result. And, the serving cell may determine whether the macro eNodeB in a neighboring cell or an RRH causes great interference to the UE actually, by using the RSRP difference. Accordingly, the serving cell may transmit the interference cancellation assistance information for the UE to remove interference from the signal/channel transmitted from a target which is determined to exert great interference.

An implementation method is described in more detail below with reference to FIG. 14.

Figure 14:
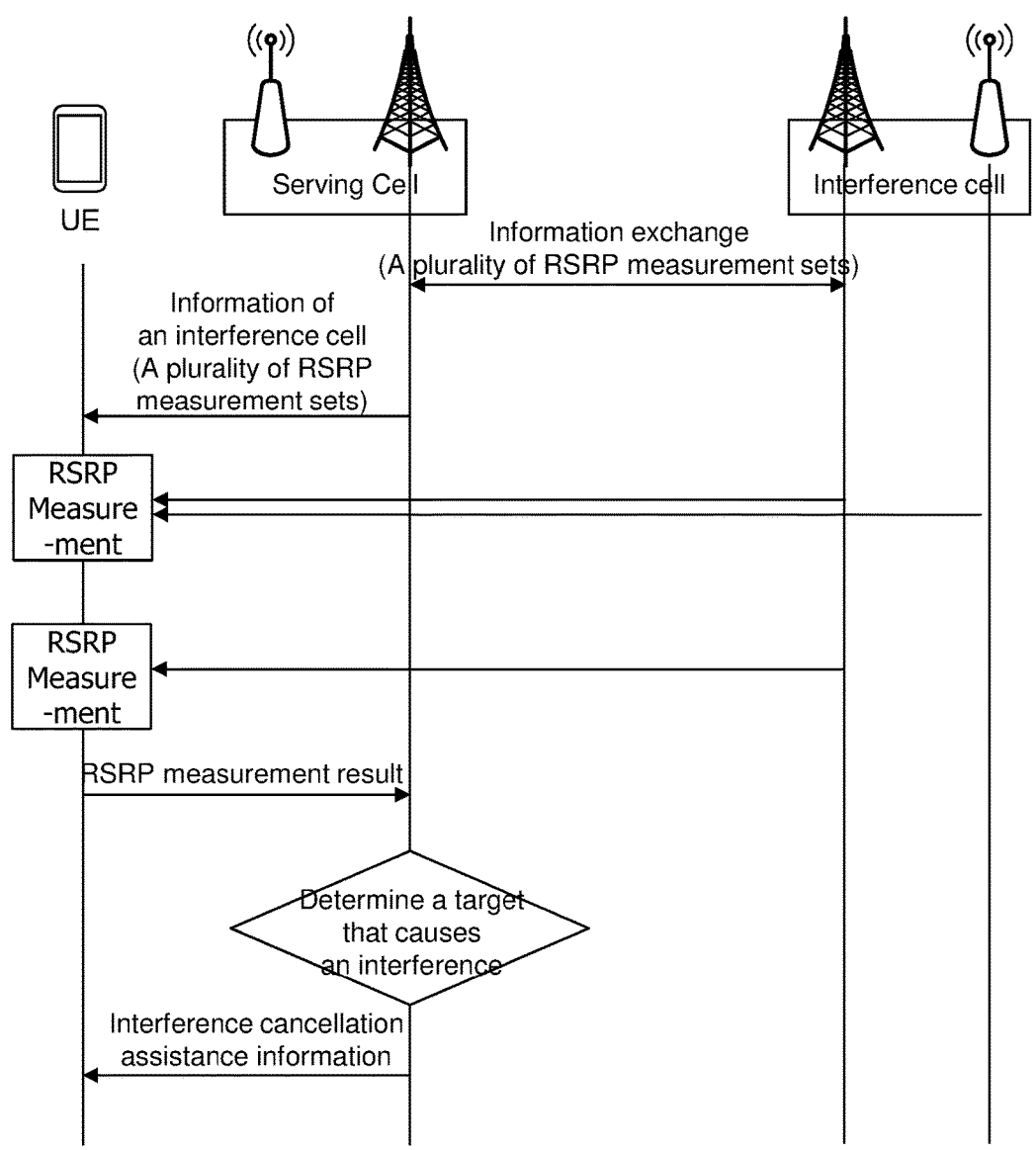
FIG. 14 is a flowchart illustrating an operation according to a disclosure of the present specification.

FIG. 14 is a flowchart illustrating an operation according to a disclosure of the present specification.

After a serving cell acquires the information on a plurality of measurement sets (e.g., measurement set 0 and measurement set 1) of an interference cell, the serving cell forward the information to a UE.

The information of each measurement set may be received through an RRC signal or may be a bitmap format. For example, the measurement set may be a bitmap such as 0100000001. Here, each bit represents whether the measurement is performed or not on the subframe of a corresponding position. Bit 1 represents that the measurement should be performed, and bit 0 represents that the measurement should not be performed.

The UE measures an RSRP (a first RSRP measurement result) on the subframe indicated by the measurement set 0 of the interference cell acquired from the serving cell.

In addition, the UE measures an RSRP (a second RSRP measurement result) on the subframe indicated by the measurement set 1.

And, the UE reports the first RSRP measurement result and the second RSRP measurement result to the serving cell.

The serving cell determines whether a macro eNodeB in the interference cell or an RRH causes great interference to the UE actually, by using the difference between the first RSRP measurement result and the second RSRP measurement result.

For example, when the first RSRP measurement result of the interference cell–the second RSRP measurement result>$D_{th}$, the interference from the RRH is greater than the interference from the macro eNodeB in the interference cell. On the contrary, when the first RSRP measurement result of the interference cell–the second RSRP measurement result<$D_{th}$, the interference from the macro eNodeB is greater than the interference from the RRH in the interference cell.

And, the serving cell transmits the interference cancellation assistance information for the UE to remove interference from the signal/channel transmitted from a target which is determined to exert great interference.

Meanwhile, although it is shown in FIG. 14 that there is one interference cell, even in the case that there are several interference cells, the serving cell may determine whether a macro eNodeB in the interference cell or an RRH causes great interference by comparing a plurality of RSRP measurement results for each interference cell.

The embodiments of the present invention described so far may be implemented through various means. For example, the embodiments of the present invention may be implemented by hardware, firmware, software or the combination thereof. Particularly, this will be described by reference to the following drawing.

Figure 15:
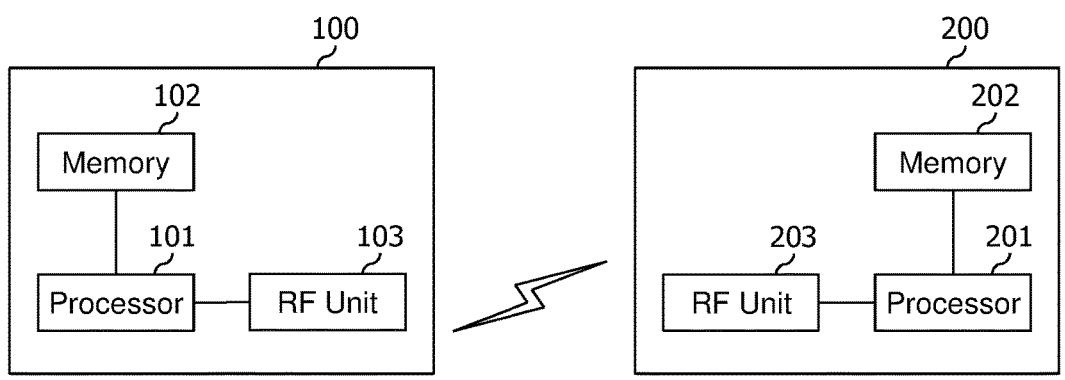
FIG. 15 is a block diagram illustrating a wireless communication system in which a disclosure of the present specification is implemented.

FIG. 15 is a block diagram illustrating a wireless communication system in which a disclosure of the present specification is implemented.

The eNodeB 200 includes a processor 201, a memory 202, and an RF (radio frequency) unit 203. The memory 202 is connected with the processor 201 and stores various pieces of information for driving the processor 201. The RF unit 203 is connected with the processor 201 and transmits and/or receives radio signals. The processor 201 implements functions, processes, and/or methods as suggested herein. In the above-described embodiments, the operation of the base station may be implemented by the processor 201.

The UE 100 includes a processor 101, a memory 102, and an RF unit 103. The memory 102 is connected with the processor 101 and stores various pieces of information for driving the processor 101. The RF unit 103 is connected with the processor 101 and transmits and/or receives radio signals. The processor 101 implements functions, processes, and/or methods as suggested herein.

The processor may include an application-specific integrated circuit (ASIC), a separate chipset, a logic circuit, and/or a data processing unit. The memory may include a read-only memory (ROM), a random access memory (RAM), a flash memory, a memory card, storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

In the above-described systems, the methods are described with the flowcharts having a series of steps or blocks, but the present invention is not limited to the steps or order. Some steps may be performed simultaneously or in a different order from other steps. It will be understood by one of ordinary skill that the steps in the flowcharts do not exclude each other, and other steps may be included in the flowcharts or some of the steps in the flowcharts may be deleted without affecting the scope of the invention.

What is claimed is:

1. A method for removing interference, the method performed by a user equipment (UE) and comprising:
receiving first information related to a plurality of measurement sets from a serving cell, the plurality of measurement sets related to an interference cell and including a first measurement set and a second measurement set;
performing a first measurement on a first subframe included in the first measurement set based on a Cell-specific Reference Signal (CRS) received on the first subframe from both a macro eNodeB and a Remote radio head (RRH);
performing a second measurement on a second subframe included in the second measurement set based on a CRS received on the second subframe from the macro eNodeB;
transmitting a result of the first measurement and a result of the second measurement to the serving cell;
receiving second information from the serving cell, the second information indicating which of the macro eNodeB or the RRH causes greater interference to the UE; and
removing interference from the indicated eNodeB or the RRH based on the received second information,
wherein the eNodeB and the RRH are included in the interference cell, and
wherein the RRH and macro eNodeB have a same cell identifier.

2. The method of claim 1, wherein the first measurement set and the second measurement set include different subframes.

3. The method of claim 1, wherein the macro eNodeB and the RRH are configured by cooperative communication according to a Cooperative Multi-point.

4. The method of claim 1, wherein the received first information is represented by a bitmap format.

5. The method of claim 1, wherein the first information is received via higher layer signaling.

6. A user equipment (UE) for removing interference, the UE comprising:
a transceiver configured to receive information; and
a processor operatively connected to the transceiver and configured to:
control the transceiver to receive first information related to a plurality of measurement sets from a serving cell, the plurality of measurement sets related to an interference cell and including a first measurement set and a second measurement set;
perform a first measurement on a first subframe included in the first measurement set based on a Cell-specific Reference Signal (CRS) received on the first subframe from both a macro eNodeB and a Remote radio head (RRH);

perform a second measurement on a second subframe included in the second measurement set based on a CRS received on the second subframe from the macro eNodeB;

control the transceiver to transmit a result of the first measurement and a result of the second measurement to the serving cell;

control the transceiver to receive second information from the serving cell, the second information indicating which of the macro eNodeB or the RRH causes greater interference to the UE; and remove interference from the indicated eNodeB or the RRH based on the received second information, wherein the eNodeB and the RRH are included in the interference cell, and wherein the RRH and macro eNodeB have a same cell identifier.

7. The UE of claim 6, wherein the first measurement set and the second measurement set include different subframes.

8. The UE of claim 6, wherein the macro eNodeB and the RRH are configured by cooperative communication according to a Cooperative Multi-point.

9. The UE of claim 6, wherein the received first information is represented by a bitmap format.

10. The UE of claim 6, wherein the first information is received via higher layer signaling.

* * * * *